United States Patent

[11] 3,600,117

[72] Inventor Hans G. Hirsbrunner
 Attleboro, Mass.
[21] Appl. No. 822,903
[22] Filed May 8, 1969
[45] Patented Aug. 17, 1971
[73] Assignee Texas Instruments Incorporated
 Dallas, Tex.

[54] FURNACE FUEL VALVE ENERGIZING CIRCUIT
 4 Claims, 1 Drawing Fig.
[52] U.S. Cl. ........................................... 431/66,
 431/71, 431/254
[51] Int. Cl. ........................................... F23n 5/12
[50] Field of Search .......................... 431/66, 25
 A, 71, 89; 236/15 B, 78 B

[56] References Cited
 UNITED STATES PATENTS
| | | | |
|---|---|---|---|
| 3,399,948 | 9/1968 | Myers et al. | 431/71 X |
| 3,425,780 | 2/1969 | Potts | 431/71 X |
| 3,443,752 | 5/1969 | Walbridge | 431/66 X |
| 3,447,880 | 6/1969 | Potts et al. | 431/66 X |
| 3,484,177 | 12/1969 | Florio et al. | 431/254 |
| 3,488,132 | 1/1970 | Fairley et al. | 431/66 |

Primary Examiner—Frederick L. Matteson
Assistant Examiner—Robert A. Dua
Attorneys—Harold Levine, Edward J. Connors, Jr., John A. Haug, James P. McAndrews and Gerald B. Epstein

ABSTRACT: In an electrothermal furnace control, means for energizing the fuel valve, the fuel valve being an electrically energizable type requiring a higher level of energization for initially supplying fuel and a lesser level for continuing to supply fuel. A triggerable semiconductor current-switching device includes main terminals connected in a circuit with the main fuel valve to an AC power source. Means is provided for supplying triggering current to cause triggering of the switching device for initially energizing the fuel valve at the higher level but ceases to supply the triggering current after ignition of the fuel. Means connect the fuel valve to the power source to supply energization at the lower level such that the valve is insufficiently energized to initially supply fuel to the burner, but after triggering of the switching device remains energized for continuing to supply fuel to the burner until disconnected from the source of power.

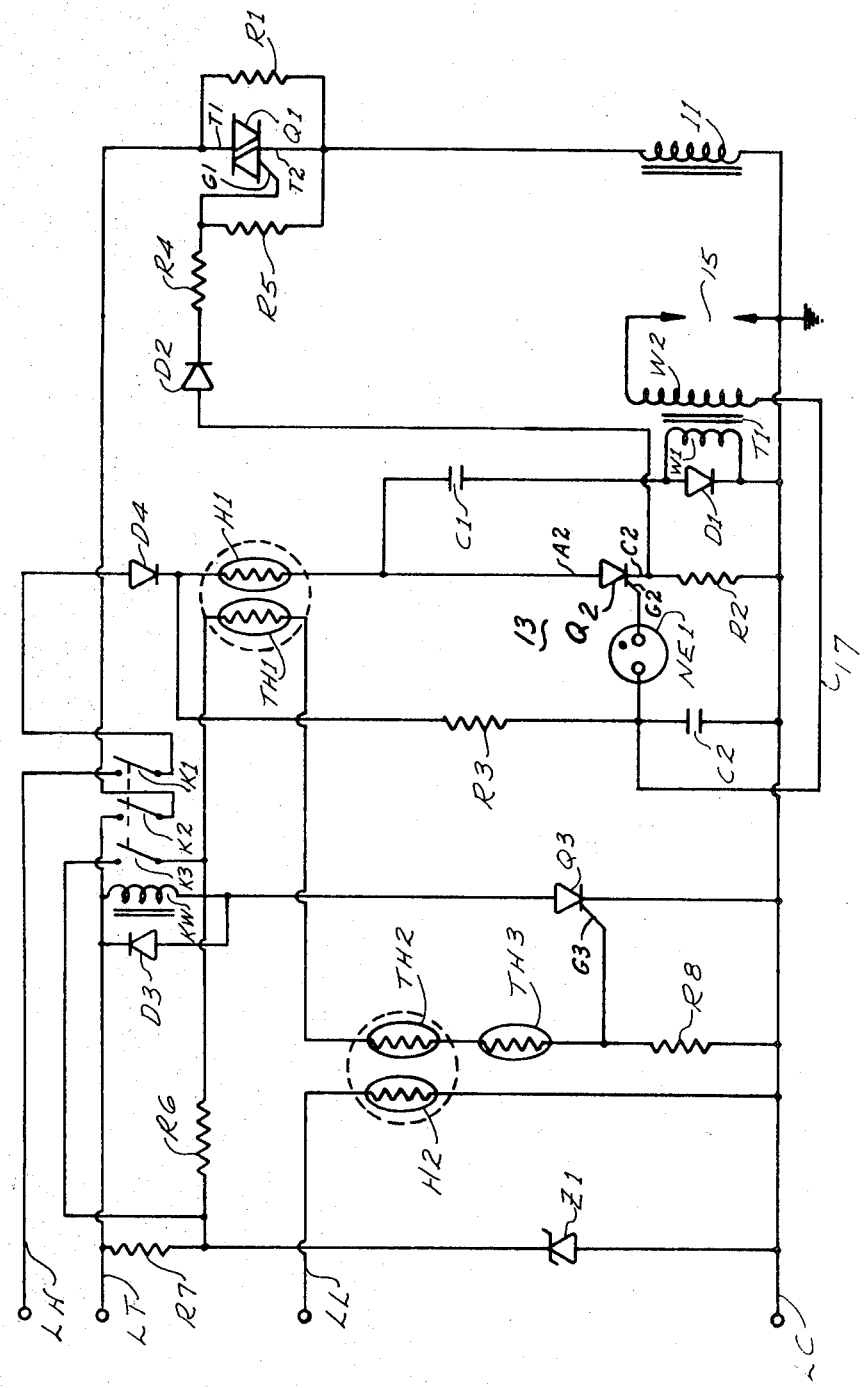

FURNACE FUEL VALVE ENERGIZING CIRCUIT

This invention relates to an electrothermal furnace control, and more particularly to a circuit for use in such a control for energizing a furnace fuel valve.

Certain kinds of furnaces include an electrically energizable fuel valve, e.g., a solenoid-operated gas valve, which it is desired to energize for initially supplying fuel upon generation of a signal from a fuel ignition circuit when the latter is energized to generate sparking. After ignition of the fuel, it is desired that the fuel valve remain energized to continue supplying fuel to the burner so long as the furnace thermostat continues to demand heat. Representative of the type of furnace control in which the presently disclosed invention is useful is the electrothermal furnace control described in application Ser. No. 822,902, filed May 8, 1969.

Among the several objects of the present invention may be noted the provision of circuitry for energizing a furnace fuel valve of the type requiring a predetermined higher level of energization for initially supplying fuel and requiring a predetermined lesser level of energization for continuing to supply fuel; the provision of such circuitry which is nonelectromechanical in nature and thereby not prone to failure; the provision of such circuitry which is safe and long-lasting in operation; and the provision of such circuitry which is simple and economically manufactured. Other objects and features will be in part apparent and in part pointed out hereinafter.

Briefly, circuitry of the present invention is used in apparatus for controlling the operation of a furnace having a burner and an electrically energizable fuel valve which, when sufficiently energized, supplies fuel to the burner. The fuel valve is of the type requiring a predetermined higher level of energization for initially supplying fuel to the burner and a predetermined lesser level of energization for continuing to supply fuel. The furnace control apparatus includes means for igniting the fuel. A circuit of the present invention for energizing the fuel valve includes a triggerable semiconductor current-switching device having main terminals and a triggering terminal, the main terminals being connected in a circuit with the fuel valve to an AC source of power to supply power at the higher level of energization to the fuel valve when a triggering current is supplied to the triggering terminal. Means is provided for supplying a triggering current to the triggering terminal for triggering the switching device. This initially energizes the fuel valve at the higher level. The triggering current ceases after ignition of the fuel. Means is included for connecting the fuel valve to the source of power to supply energization at the lower level so that the fuel valve is insufficiently energized to initially supply fuel to the burner but, after triggering of the switching device and ignition of the fuel, remains energized for continuing to supply fuel to the burner until disconnected from the source of power.

In the accompanying drawing in which is illustrated one of various possible embodiments of the invention, the single figure is a circuit schematic diagram of apparatus employing the present invention.

Referring to the drawing, there is illustrated an electrothermal furnace control of this invention which is adapted to control a furnace such as a gas-fired, forced hot air furnace conventionally used for residential heating. The furnace is of the type having a burner to which gas is supplied for combustion when a solenoid-operated fuel valve is opened by energization of its winding 11, all generally as described and illustrated in the aforesaid patent application. The apparatus controls the operation of the furnace in response to the demand of a conventional thermostat (not shown) which senses the temperature of a zone heated by the furnace. A line LT is provided for connection in conventional manner to a thermostat, the line being energized by a suitable low voltage, e.g., 24v. AC with respect to common line LC, whenever the thermostat circuit closes thus indicating a demand for heating of the zone wherein the thermostat is located. A line LL is provided for connection of the apparatus to a continuous source of AC power preferably of the same low AC voltage, i.e., 24v. AC with respect to common line LC. A line LH is provided for connection of the apparatus to an AC source of a higher potential, e.g., line voltage at 115v. AC with respect to common line LC.

The fuel valve is of the type requiring a predetermined higher level of energization for initially opening to supply fuel to the burner and requiring a predetermined lesser level of energization for continuing to supply fuel. Connected in a series circuit with fuel valve winding 11 are the main terminals T1, T2 of triac Q1 which, as will be appreciated by those skilled in the art, is a triggerable semiconductor current-switching device which is rendered conductive between the main terminals thereof when a triggering current is supplied to its triggering terminal G1. A resistor R1 is connected across the main terminals of triac Q1 for a purpose which will be explained.

Indicated generally at 13 is an ignition circuit which, upon energization, generates recurrent sparking for igniting the fuel supplied to the burner of the furnace. The circuit includes a triggerable semiconductor switching device constituted by a silicon-controlled rectifier (SCR) Q2 having its anode A2 and cathode terminals connected in a circuit with a capacitor C1, a resistor R2 and the primary winding W1 of a conventional spark transformer T1. The winding W1 is shunted by a so-called halfback diode D1 for suppressing inductively induced voltage thereacross on deenergization of the winding. Spark transformer T1 includes a high-voltage winding W2 connected with a pair of electrodes 15 located at the burner for causing ignition of the fuel be recurrent sparking thereacross. Interconnected with the gate or triggering terminal of the SCR Q2 are a neon bulb NE1 and a capacitor C2, one side of the capacitor being connected to the common lead LC. A connection 17 is provided from the junction of capacitor C2 and neon bulb NE1 to one side of high-voltage winding W2 for a purpose to explained. The capacitor is adapted to be charged through a resistor R3. A triggering circuit for supplying a triggering current to the triggering terminal of triac Q1 includes a diode D2 and a resistor R4 in a series circuit connecting the triggering terminal of triac Q1 and the cathode terminal of SCR Q2, and a resistor R5 interconnecting the triggering terminal of triac Q1 and the adjacent main terminal thereof.

Another SCR Q3 having an anode terminal A3 and cathode terminal C3 is connected in a series circuit across lines LT and LC with the winding KW of a conventional magnetic contactor having pairs of normally open contacts K1, K2 and K3 which are closed by energization of winding KW, the latter being energized by triggering of SCR Q3. SCR Q3 and the contactor together constitute a power circuit for supplying power to ignition circuit 13 and the fuel valve circuit. A halfback diode D3 is connected across winding KW for suppressing any inductively induced voltage on deenergization of the winding. Contacts K1 are adapted, when closed, to complete a series circuit including a diode D4 and a thermistor H1 for energization of ignition circuit 13. When contacts K2 are are closed, a series circuit is completed to supply power from thermostat line LT to triac Q1 and fuel valve winding 11 when the thermostat demands heat. When closed, contacts K3 shunt a resistor R6 which is part of a triggering circuit interconnected with the triggering terminal G3 of SCR Q3. This triggering circuit is connected to supply triggering current from line LT to SCR Q3 and includes a resistor R7, resistor R6 and thermistors TH1, TH2 and TH3. A resistor R8 interconnects the triggering terminal of triac Q3 and common line LC. A Zener diode Z1 is connected from the junction of resistors R6 and R7 to common line LC for regulating the voltage provided to this triggering circuit.

Thermistor TH1 has a positive temperature coefficient of resistivity (PTC) and a well-defined transition temperature, e.g., 80° C., above which the resistance thereof increases relatively abruptly. Thermistor H1 is a heater thermistor which is thermally coupled to thermistor TH1 to provide means, when energized, for heating the latter. Preferably thermistor H1 is also a PTC type of thermistor and also has a well-defined transition temperature above which its resistance increases relatively abruptly, its transition temperature being somewhat higher, e.g., 120° C., that of thermistor TH1. As will be explained, if thermistor TH1 is heated above a predetermined threshold temperature, corresponding with its transition temperature, triggering of SCR Q3 will be prevented. Upon being heated by thermistor H1, thermistor TH1 requires a predetermined heating time interval, e.g., 4—10 seconds, to reach this threshold temperature and thus thermistors TH1 and H1 together constitute an electrothermal timer.

Thermistor TH2 is provided with a heater thermistor H2 interconnecting lines LL and LC. Thermistor H2 is thermally coupled to thermistor TH2 to provide means for heating the latter. Thermistors TH2 and H2 are both PTC types having well-defined transition temperatures above which the resistance thereof increases relatively abruptly, thermistor TH2 having a transition temperature, for example, of 80° C. and that of thermistor H2 being, for example, 120° C. Thermistors TH2 and H2 together constitute a draft sensor or airflow sensor and are suitable mounted in a furnace air draft duct or in conjunction with a draft blower of the furnace for causing thermistor TH2 to be cooled by the forced air draft as long as there is sufficient forced draft provided to the burner. Thermistor TH2 is, like thermistor TH1, adapted to prevent triggering current from being supplied to the gate terminal of SCR Q3 when thermistor TH2 is heated above a predetermined threshold temperature corresponding to its transition temperature. The thermal coupling between thermistors H2 and TH2 is such that thermistor H2 normally supplies insufficient heat to cause thermistor TH2 to be heated above its transition temperature as long as there is sufficient forced draft for cooling it, but causes heating of the thermistor above its threshold temperature if there is insufficient forced draft.

Thermistor TH3 is a plenum temperature-sensing thermistor and is located in the plenum of the furnace for sensing the temperature therein. Like thermistors TH1 and TH2, thermistor TH3 is also a PTC thermistor preferably having a well-defined transition temperature above which the resistance thereof increases relatively abruptly. When heated above a predetermined threshold temperature corresponding to a maximum permissible temperature in the plenum, thermistor TH3 also prevent triggering of SCR Q3.

In the operation of the control, it is assumed that lines LL and LH are connected to appropriate sources of power, e.g., 24 v. and 115 v. AC, respectively, that a sufficient forced air draft is being satisfactorily provided to the burner and that the plenum of the furnace is cool. Thus, thermistors TH2 and TH3 are relatively cool and, accordingly, exhibit a low resistance.

With regard to the draft sensor or air flow sensor constituted by thermistors TH2 and H2, it will be appreciated that, when line LL is connected to a low voltage AC source, heater thermistor H2 self-heats due to internal resistive consumption of power until it reaches the transition temperature of the thermistor material therein, whereupon the resulting increase of its resistance causes a decrease in the power consumed to maintain the thermistor substantially at the transition temperature. However, as long as there is a sufficient forced air draft, thermistor TH2 remains relatively cool. Since contacts K1 are opened, no power is supplied to heater thermistor H1 and accordingly, thermistor TH1 is also relatively cool.

When the thermostat in the zone which is heated by operation of the furnace demands heat, the thermostat supplies AC voltage, i.e., 24v. AC, to line LT, such as by closing a pair of contacts in the thermostat, as is conventional. Since thermistors TH1, TH2 and TH3 each exhibits a relatively low resistance, a triggering current is supplied to the gate or triggering terminal of SCR Q3, which is forward biased on alternate half cycles of the waveform of the AC voltage applied across its main terminals through the contactor winding KW. SCR Q3 is accordingly triggered to energize contactor winding KW.

Energization of winding KW closes the normally open contacts K1, K2 and K3. The closing of contacts K1 completes a circuit from line LH through diode D4 and heater thermistor H1 to energize ignition circuit 13, the voltage appearing between lines LH and LC forward biasing SCR Q2 on alternate half cycles of the applied AC waveform. The power supplied through thermistor H1 also causes capacitor C1 to quickly charge to peak voltage. Simultaneously, current is supplied through resistor R3 to charge capacitor C2. When the voltage across capacitor C2 reaches a sufficient level, neon bulb NE1 breaks down or conducts to supply a triggering current to the gate terminal of SCR Q2. SCR Q2 is thereby triggered and becomes conductive, discharging capacitor C1 through the primary winding W1 of transformer T1. Secondary winding W2 steps up the voltage across winding W1 to cause sparking across electrodes 15. Resistor R3 limits the current which can flow to charge capacitor C2 so that it charges in somewhat more time than capacitor C1 and thus capacitor C1 is ready for discharge when capacitor C2 reaches the voltage of neon bulb NE1. Capacitor C2 reaches this breakdown voltage many times per second, causing repetitive triggering of SCR Q2 and thus providing recurrent sparking across electrodes 15.

Upon triggering of SCR Q2, the voltage drop across resistor R2 is supplied through the connection including diode D2 and resistor R4 to the triggering terminal of triac Q1. The closed contacts K2 provide triac Q1 with voltage across its main terminals and thus triac Q1 is triggered and conducts to initially energize fuel valve winding 11 at the level of energization required for initially supplying fuel to the burner. Diode D2 and resistor R4 thus provide means for supplying triggering current to the triggering terminal of triac Q1 for initially energizing the fuel valve, with resistors R4 and R5 together constituting a voltage divider for applying the triggering current at the proper voltage.

The recurrent sparking across electrodes 15 ignites the gas. When ignition occurs, the presence of flame at electrodes 15 provides a conductive path thereacross. By virtue of a conductor 17 connecting the lower side of a winding W2 to the top of capacitor C2, the resultant conductive path across electrodes 15 causes capacitor C2 to be discharged and to remain discharged so long as combustion continues. When capacitor C2 is discharged, SCR Q2 ceases to be triggered and thus ignition circuit 13 ceases to generate sparking after ignition of the fuel. When triggering of SCR Q2 ceases, triggering current ceases to be supplied through diode D2 and resistor R4 to triac Q1 and thus it, too, ceases to conduct. However, and in accordance with this invention, resistor R1 provides means for maintaining energization of the fuel valve following initial energization thereof by triac Q1. Resistor R1 provides a power connection from line LT to winding 11 and thus energizes the winding at the predetermined lesser level required for continuing to supply fuel to the burner. If, while the thermostat continues to demand heat, combustion at the burner should cease, capacitor C2 will be permitted to charge and SCR Q2 will thus once more be repetitively triggered to generate sparking across electrodes 15. It will also be appreciated that, with such a fuel valve-energizing circuit, should power to the fuel valve winding be momentarily interrupted, the valve will close and terminate the supply of fuel to the burner until such time as ignition circuit 13 once more generates sparking and thereby again triggers triac Q1. Operation is thus fail-safe if either the ignition circuit or fuel valve circuit should fail.

With the ignition circuit 13 thus deenergized but with combustion continuing at the burner, the furnace supplies heat to the zone in which the thermostat is located until the thermostat circuit between LT and LC opens thereby indicating no further demand for heat. When this occurs, the thermostat ceases to supply voltage to line LT and thus triggering current ceases to be supplied to SCR Q3, thereby deenergizing contactor winding KW and opening contacts K1, K2 and K3.

It should be noted that so long as SCR Q2 is triggered to generate sparking across electrodes 15, thermistor H1 is concomitantly energized with ignition circuit 13 by the power drawn thereby and thus self-heats to cause heating of thermistor TH1. Upon being heated by heater thermistor H1, thermistor TH1 requires a predetermined heating time interval, i.e., 4—10 seconds, to reach the predetermined threshold temperature at which it will prevent further triggering of SCR Q3. Thus, if ignition circuit 13 does not cease generating sparking as a result of the discharge of capacitor C2 by conduction across electrodes 15 caused by fuel combustion, thermistor TH1 will be heated sufficiently to cause triggering of SCR Q3 to cease. When this occurs, contactor winding KW is deenergized and contacts K1, K2 and K3 are permitted to open. In other words, if ignition does not occur within this predetermined ignition trial time interval, thermistor TH1 acts to interrupt the supply of power from the power circuit, since the opening of contacts K2 deenergizes the circuit including triac Q1 and fuel valve winding 11 to prevent fuel from being further supplied to the burner.

Such a deenergization of contactor winding KW also opens contacts K1 to deenergize ignition circuit 13. This permits heater thermistor H1, and thus thermistor TH1, to cool. If the thermostat continues to demand heat, line LT will remain energized with AC voltage so that, when thermistor TH1 has cooled sufficiently, SCR Q3 is retriggered to cause automatic resetting for recycling of the control and thus reenergizes ignition circuit 13 and fuel valve winding 11 to cause a new ignition attempt. If ignition of the fuel still fails to occur, thermistor TH1 is again heated and causes triggering of SCR Q3 to cease. Such recycling continues indefinitely as long as the thermostat continues to demand heat.

It will be noted that resistor R6 is shunted by contacts K3 as long as contactor winding KW is energized to cause these contacts to be closed, but that resistor R6 is, in effect, switched into the triggering circuit for SCR Q3 whenever contacts K3 open. Thus SCR Q3 is initially triggered at a first voltage for initial triggering thereof when contacts K3 are open, but is triggered at a higher voltage for continuing triggering thereof when contacts K3 close and shunt resistor R6. This has the effect of altering the response of thermistor TH1 to cause the interval during which it is cooled from the predetermined threshold temperature at which triggering of SCR Q3 ceases to the temperature at which SCR Q3 is once more triggered to be substantially greater than its heating interval. In other words, the recycling time interval of the control is substantially greater than the ignition trial interval and thus desirably permits purging of any accumulated gas between ignition attempts. The effect of switching resistor R6 into the triggering circuit for SCR Q3 upon heating of thermistor TH1 to its threshold temperature is to provide an interval in which thermistor TH1 requires, for example, from 20—40 seconds to recool for causing a new ignition attempt.

In a manner similar to the operation of thermistor TH1, if either of thermistors TH2 or TH3 is heated above the threshold temperature thereof, triggering of SCR Q3 ceases. Thus, if insufficient draft is supplied to the burner, heating of thermistor TH2 by thermistor H2 causes thermistor TH2 to exceed a threshold temperature at which insufficient current will be supplied to the triggering terminal of SCR Q3 to cause triggering thereof. Similarly, if the temperature in the furnace plenum should be excessive, plenum temperature sensing thermistor TH3 will be heated above its threshold level, causing triggering of SCR Q3 to cease.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

What I claim is:

1. An apparatus for controlling the operation of a furnace including a burner and an electrically energizable fuel valve which when sufficiently energized, supplies fuel to the burner, said fuel valve requiring a predetermined higher level of energization for initially supplying fuel and requiring a predetermined lesser level of energization for continuing to supply fuel, said apparatus including direct current means for igniting the fuel, alternating current means for energizing the fuel valve comprising:

a triggerable semiconductor current-switching device having main terminals and a triggering terminal and being conductive between said main terminals when a triggering current is supplied to said triggering terminal, said main terminals being connected in a circuit with the fuel valve to an AC source of power;

means for supplying a triggering current to said triggering terminal to cause controlled triggering of said switching device for initially energizing the fuel valve at the higher level but ceasing to supply said triggering current after ignition of the fuel including a diode connected between said triggering terminal and the direct current ignition means; and means for connecting the fuel valve to the source of power to supply energization at the lower level, whereby the fuel valve is insufficiently energized to initially supply fuel to the burner but, after triggering of said switching device and ignition of the fuel, remains energized for continuing to supply fuel to the burner until disconnected from the source of power.

2. In apparatus as set forth in claim 1, said means for connecting the fuel valve to the source of power to supply energization at the lower level comprising a resistance connected across the main terminals of said switching device.

3. In apparatus as set forth in claim 1, said switching device comprising a triac.

4. In apparatus as set forth in claim 1, said means for supplying a triggering current further including a resistance connected in series with said diode and resistance interconnecting said triggering terminal and one of said main terminals.